United States Patent
Ebara et al.

[19]

[11] Patent Number: 5,962,785
[45] Date of Patent: Oct. 5, 1999

[54] VIBRATING GYROSCOPE

[75] Inventors: Kazuhiro Ebara; Katsumi Fujimoto; Shiro Makino, all of Nagaokakyo, Japan

[73] Assignee: Murata Manufacturing Co., Ltd., Kyoto-fu, Japan

[21] Appl. No.: 08/874,672

[22] Filed: Jun. 13, 1997

Related U.S. Application Data

[62] Division of application No. 08/798,989, Feb. 11, 1997, which is a continuation of application No. 08/309,657, Sep. 21, 1994, abandoned.

[30] Foreign Application Priority Data

Sep. 24, 1993 [JP] Japan ..................................... 5-261703
Sep. 27, 1993 [JP] Japan ..................................... 5-264324

[51] Int. Cl.⁶ ................................................... G01C 19/00
[52] U.S. Cl. ............................................................. 73/504.12
[58] Field of Search ............................ 73/504.14, 504.12, 73/504.02; 310/315, 316, 317, 318

[56] References Cited

U.S. PATENT DOCUMENTS

| | | | |
|---|---|---|---|
| 2,207,783 | 7/1940 | Carlson et al. | 361/274.1 |
| 3,728,641 | 4/1973 | Fujita et al. | 331/116 FE |
| 3,813,946 | 6/1974 | Robbins, Jr. et al. | 73/430 |
| 4,109,456 | 8/1978 | Yamada et al. | 368/202 |
| 4,195,326 | 3/1980 | Ruegg et al. | 361/274.1 |
| 4,694,696 | 9/1987 | Hojo et al. | 73/497 |
| 5,088,326 | 2/1992 | Wada et al. | 73/514.34 |
| 5,117,148 | 5/1992 | Nakamura et al. | 310/367 |
| 5,220,833 | 6/1993 | Nakamura | 73/504.12 |
| 5,635,787 | 6/1997 | Mori et al. | 310/316 |
| 5,668,317 | 9/1997 | Farine et al. | 73/497 |

FOREIGN PATENT DOCUMENTS 4-178517  6/1992  Japan .

*Primary Examiner*—Hezron Williams
*Assistant Examiner*—Richard A. Moller
*Attorney, Agent, or Firm*—Nikaido Marmelstein Murray & Oram LLP

[57] ABSTRACT

A vibrating gyroscope includes a vibrator having a triangular prism shaped vibrating body and piezoelectric elements. An oscillation circuit is connected between two piezoelectric elements and another piezoelectric element. Output signals from two piezoelectric elements are applied to input terminals of a differential circuit. The differential circuit is connected to a synchronous detecting circuit, and the synchronous detecting circuit is connected to a smoothing circuit. A temperature compensating capacitor is connected between two piezoelectric elements that are connected to the differential circuit. The oscillation circuit consists of an amplifier and a phase shifter having a resistor and a capacitor. As the capacitor used in the phase shifter, the temperature compensating capacitor may be used.

16 Claims, 14 Drawing Sheets

VIBRATING GYROSCOPE

This is a divisional, of application Ser. No. 08/798,989 filed Feb. 11, 1997 which is a continuation application of application Ser. No 08/309,657 filed on Sep. 21, 1994, now abandoned.

BACKGROUND OF THE INVENTION

1. Field of the invention

The present invention relates to a vibrating gyroscope, and particularly to a vibrating gyroscope using bending vibration of pillar shaped vibrator.

2. Description of the Prior Art

FIG. 15 is an illustrating view showing a conventional vibrating gyroscope. The vibrating gyroscope 1 has a vibrating body 2 of regular triangular prism shape. Piezoelectric elements 3a, 3b and 3c are formed on three side faces of the vibrating body 2. The piezoelectric elements 3a and 3b are used for driving a bending vibration on the vibrating body 2, and are also used for detecting output signal corresponding to a rotational angular velocity. The piezoelectric element 3c is used for a feedback when driving the vibrator 2. An oscillation circuit 4 is connected between the piezoelectric elements 3a, 3b and the piezoelectric element 3c. The piezoelectric elements 3a and 3b are connected to input terminals of a differential circuit 5. An output terminal of the differential circuit 5 is connected to a synchronous detecting circuit 6. The synchronous detecting circuit 6 is connected to a smoothing circuit 7.

In this vibrating gyroscope 1, the vibrating body 2 vibrates in bending mode in the direction perpendicular to the face that the piezoelectric element 3c is formed, in accordance with a driving signal generated by the oscillation circuit 4. When the vibrating gyroscope 1 rotates around an axis of the vibrating body 2, a vibrating motion of the vibrating body 2 changes a direction by Coriolis force. It causes a difference of output signals between the piezoelectric elements 3a and 3b, and the difference is obtained from the differential circuit 5. A signal corresponding to the rotational angular velocity applied to the vibrating gyroscope 1 is obtained by detecting an output signal from the differential circuit 5 and smoothing a measured signal.

As shown in FIG. 16, the oscillation circuit 4 includes, for example, an amplifier 8 and a phase shifter 9 connected with each other. As the phase shifter 9, a CR filter having a resistor and a capacitor is used.

In the vibrating gyroscope 1, the signal from the piezoelectric element 3c for feedback is amplified by the amplifier 8, and a phase of the signal is modulated by the phase shifter 9. The vibrating body 2 is self-oscillated by applying an output signal from the phase shifter 9 to the piezoelectric elements 3a and 3b for driving.

In the vibrating gyroscope 1 shown in FIG. 15, however, a detecting sensitivity is affected by a variation of the environment temperature. A temperature characteristic of the detecting sensitivity depends on a combination with temperature characteristics of the vibrator, the oscillation circuit and the detecting circuit. It has been a difficult problem to compensate the sensitivity changed by the temperature variation.

Owing to the temperature characteristic of the oscillation circuit, a driving signal voltage required for exciting bending vibration to the vibrating body is fluctuated by the variation of the environment temperature. A vibration mode of the vibrating body changes by the variation of the environment temperature. Then, the detecting sensitivity of the rotational angular velocity changes in the vibrating gyroscope.

SUMMARY OF THE INVENTION

It is, therefore, the primary object of the present invention to provide a vibrating gyroscope that is able to compensate the temperature characteristic of the detecting sensitivity with low cost.

The present invention is directed to a vibrating gyroscope comprising a pillar shaped vibrating body, plural detecting means formed on side faces of the vibrating body for detecting a signal corresponding to a rotational angular velocity, and a temperature compensating capacitor connected between the detecting means.

The capacitance of the temperature compensating capacitor changes by a variation of an environment temperature.

According to the present invention, by selecting the temperature compensating capacitor having a temperature characteristic inverse to a temperature characteristic of the vibrating gyroscope, a temperature variation of the detecting sensitivity can be canceled in the variation of the environment temperature. Therefore, the detecting sensitivity of the vibrating gyroscope can be constant in spite of the temperature variation.

The present invention is directed to a vibrating gyroscope comprising a pillar shaped vibrating body and an oscillation circuit for exciting a bending vibration on the vibrating body, wherein the oscillation circuit consists of an amplifier and a phase shifter having a resistor and a capacitor for modulating a phase of an output signal from the amplifier, and and a temperature compensating capacitor is used as the capacitor.

A capacitance of the temperature compensating capacitor changes by the variation of the environment temperature. A cut-off frequency of the phase shifter having the resistor and the capacitor is affected by a change of the capacitance. Then, the driving signal voltage required for exciting vibration changes in the oscillation circuit.

According to the present invention, by selecting the temperature compensating capacitor having the temperature characteristic inverse to the temperature characteristic of the oscillation circuit, the change of the driving signal voltage by the variation of the environment temperature can be canceled. Therefore, a constant signal voltage can be obtained and a bending vibration of the vibrating body can be stabilized in spite of the temperature variation.

The temperature compensating capacitor used for the vibrating gyroscope is less expensive and the cost for the temperature compensation can be reduced.

The above and other objects, features, aspects and advantages of the present invention will become more apparent from the following detailed description made with reference to the drawings.

DESCRIPTION OF THE PREFERRED EMBODIMENTS

Figure 1:
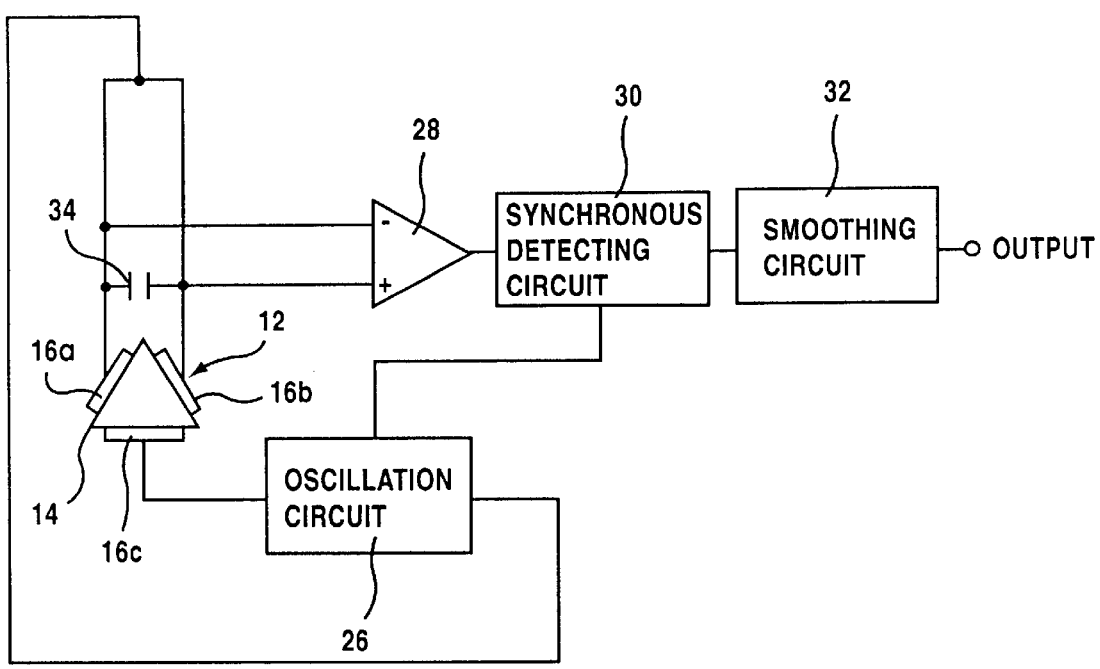
FIG. 1 is an illustrating view showing one embodiment of the present invention.
Figure 2:
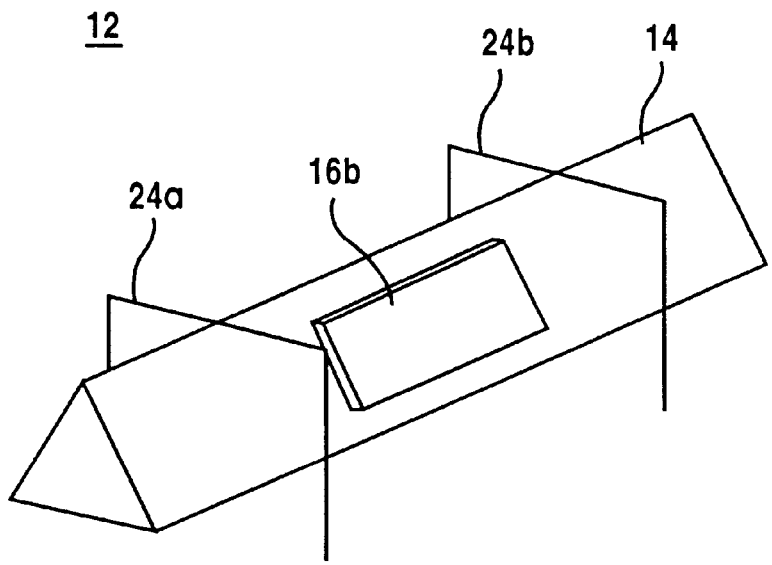
FIG. 2 is a perspective view showing a vibrating body used in the vibrating gyroscope of FIG. 1.
Figure 3:
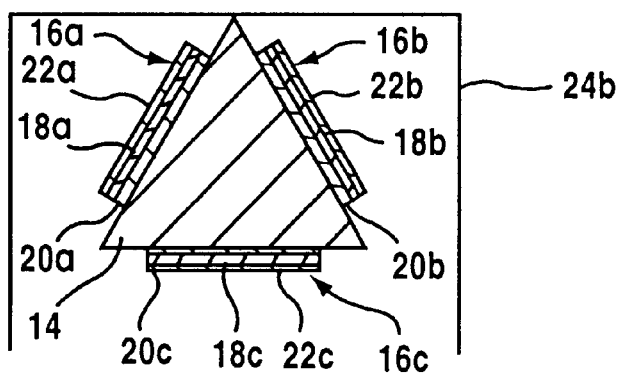
FIG. 3 is a sectional view showing the vibrating body shown in FIG. 2.

FIG. 1 is an illustrating view showing a preferred embodiment of the present invention. A vibrating gyroscope 10 includes a vibrator 12. As shown in FIG. 2 and FIG. 3, the vibrator 12 includes a vibrating body 14 having, for example, regular triangular prism shape. The vibrating body 14 is generally made of materials that generates mechanical vibration such as elinvar, iron-nickel alloy, quartz, glass, crystal or ceramics.

Three piezoelectric elements 16a, 16b and 16c are formed on three side faces of the vibrating body 14. The piezoelectric element 16a has a piezoelectric layer 18a made of material such as ceramics, and electrodes 20a and 22a are formed on both of main faces of the piezoelectric layer 18a. One electrode 20a is attached on the side face of the vibrating body 14. In the same manner, the piezoelectric elements 16b and 16c have piezoelectric layers 18b and 18c, and electrodes 20b, 22b, and electrodes 20c, 22c are formed on both of main faces of the piezoelectric layers 18b and 18c. The electrodes 20b and 20c are attached on the side faces of the vibrating body 14. The ridge of the vibrating body 14 near a nodal point is supported by supporting members 24a and 24b made of metal wires and the like. The supporting members 24a and 24b are fixed to the vibrating body 14 by a method such as welding.

The piezoelectric elements 16a and 16b are used as driving means for driving a bending vibration on the vibrating body 14 and as detecting means for detecting a signal corresponding to a rotational angular velocity. The piezoelectric element 16c is used as a feedback means when the vibrator 14 is driven. An oscillation circuit 26 is connected between the piezoelectric elements 16a, 16b for driving and the piezoelectric element 16c for feedback. The vibrator 14 vibrates in a bending mode in accordance with a driving signal from the oscillation circuit 26. The piezoelectric elements 16a and 16b are connected to input terminals of a differential circuit 28. An output terminal of the differential circuit 28 is connected to a synchronous detecting circuit 30. The synchronous detecting circuit 30 is connected to a smoothing circuit 32. In the synchronous detecting circuit 30, an output signal from the differential circuit 28 is detected synchronously to the driving signal generated in the oscillating circuit 26. A temperature compensating capacitor 34 is connected between the piezoelectric elements 16a and 16b of the vibrator 12.

In the vibrating gyroscope 10, the vibrating body 14 vibrates in the bending mode in a direction perpendicular to the face where the piezoelectric element 16c is formed. An output signal is not obtained from the differential circuit 28 in this situation, since two output signals from piezoelectric elements 16a and 16b are identical. When the vibrating gyroscope 10 rotates around an axis of the vibrating body 14, a vibrating motion of the vibrating body 14 changes a direction by Coriolis force. It causes a change for the output signals of the piezoelectric elements 16a and 16b, and a difference of the output signals between the piezoelectric elements 16a and 16b is obtained from the differential circuit 28. The output signal from the differential circuit 28 is detected by the synchronous detecting circuit 30 and smoothed by the smoothing circuit 32. Since the output signal from the differential circuit 28 corresponds to the change of the vibrating direction of the vibrating body 14, the rotational angular velocity applied to the vibrating gyroscope 10 can be detected by measuring output signal from the smoothing circuit 32.

Figure 4:
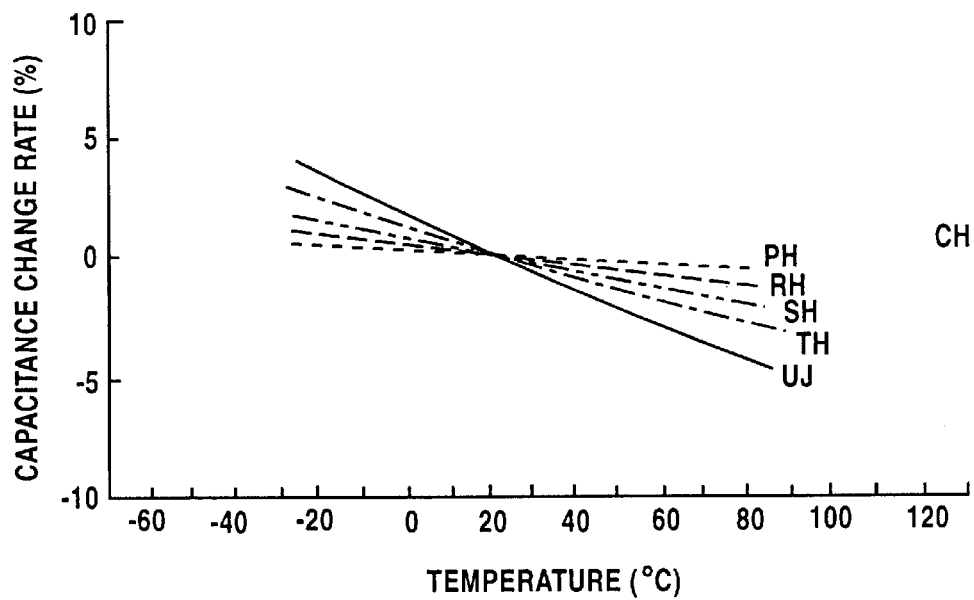
FIG. 4 is a graph showing a temperature characteristic of a temperature compensating capacitor used in the vibrating gyroscope shown in FIG. 1.

A temperature compensating capacitor 34 is connected between the piezoelectric elements 16a and 16b for compensating a temperature characteristic of a detecting sensitivity of the vibrating gyroscope 10. There are several types of the temperature compensating capacitors as shown in FIG. 4. A suitable capacitor is selected for a temperature compensation by a requirement in each case. In FIG. 4, each capacitor has its temperature characteristic such as 0±60 ppm/° C. for CH, −150±60 ppm/° C. for PH, −220±60 ppm/° C. for RH, −330±60 ppm/° C. for SH, −470±60 ppm/° C. for TH and −750±120 ppm/° C. for UJ.

Figure 5:
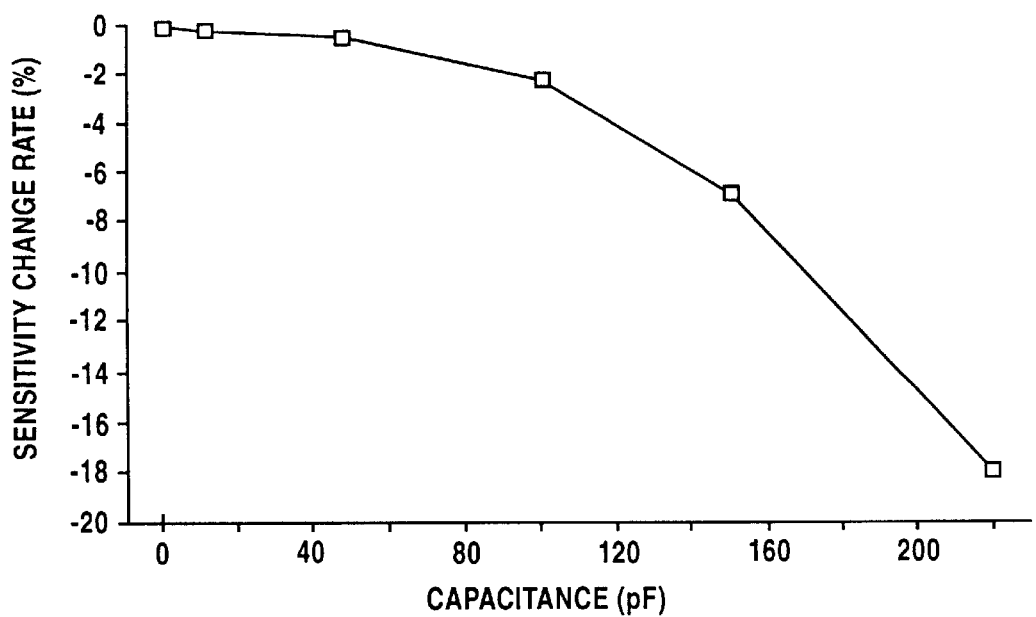
FIG. 5 is a graph sowing a relation between a capacitance of the temperature compensating capacitor and a sensitivity change rate of the vibrating gyroscope.

In the vibrating gyroscope 10, as shown in FIG. 5, the detecting sensitivity decreases in proportion to the increase of a capacitance of the temperature compensating capacitor 34. Inversely, the detecting sensitivity increases in proportion to the decrease of the capacitance of the temperature compensating capacitor 34. Therefore, as the temperature rises, the capacitance of the temperature compensating capacitor 34 decreases and the detecting sensitivity increases. As the temperature falls, the capacitance of the temperature compensating capacitor 34 increases and the detecting sensitivity decreases. In case of the vibrating gyroscope having the detecting sensitivity which decreases as the temperature rises as designated with A in FIG. 6, improved the characteristic of less dependence of the detecting sensitivity on the temperature change as designated with B in FIG. 6 is obtained by using the temperature compensating capacitor having the temperature characteristic shown in FIG. 4.

Figure 6:
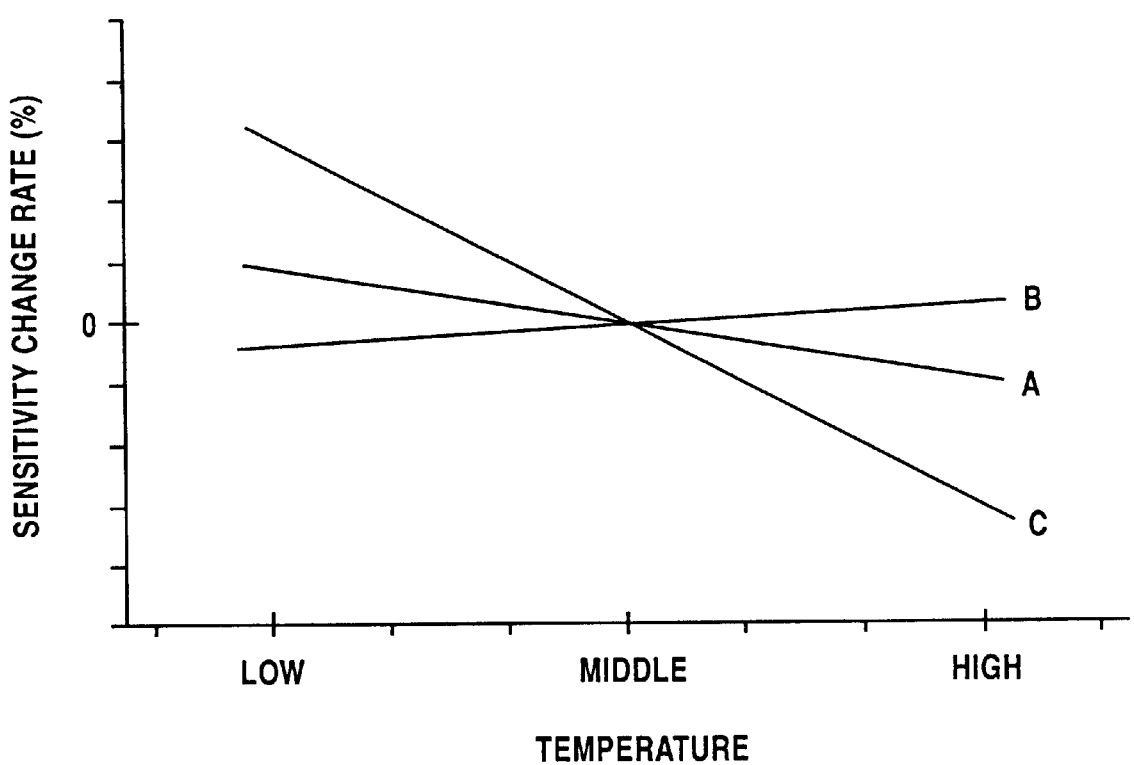
FIG. 6 is a graph showing sensitivity change rates of vibrating gyroscopes in both cases of using and not using the temperature compensating capacitor.

A characteristic of lower detecting the sensitivity for higher temperature is obtained as designated with C in FIG. 6, by using the temperature compensating capacitor having the temperature characteristic of higher capacitance for higher temperature. Therefore, by using this type of the temperature compensating capacitor, the temperature characteristic can be improved for the vibrating gyroscope that the detecting sensitivity increases as the temperature rises. The detecting sensitivity fluctuation of the vibrating gyroscope by the temperature variation can be reduced by selecting a suitable characteristic of the temperature compensating capacitor.

The temperature characteristic of the vibrating gyroscope sensitivity can be corrected by connecting the temperature compensating capacitor 34 between the piezoelectric elements 16a and 16b. As the capacitors are less expensive, it is possible to reduce total parts cost as compared with the case of using expensive electronic parts such as thermistor.

Figure 7:
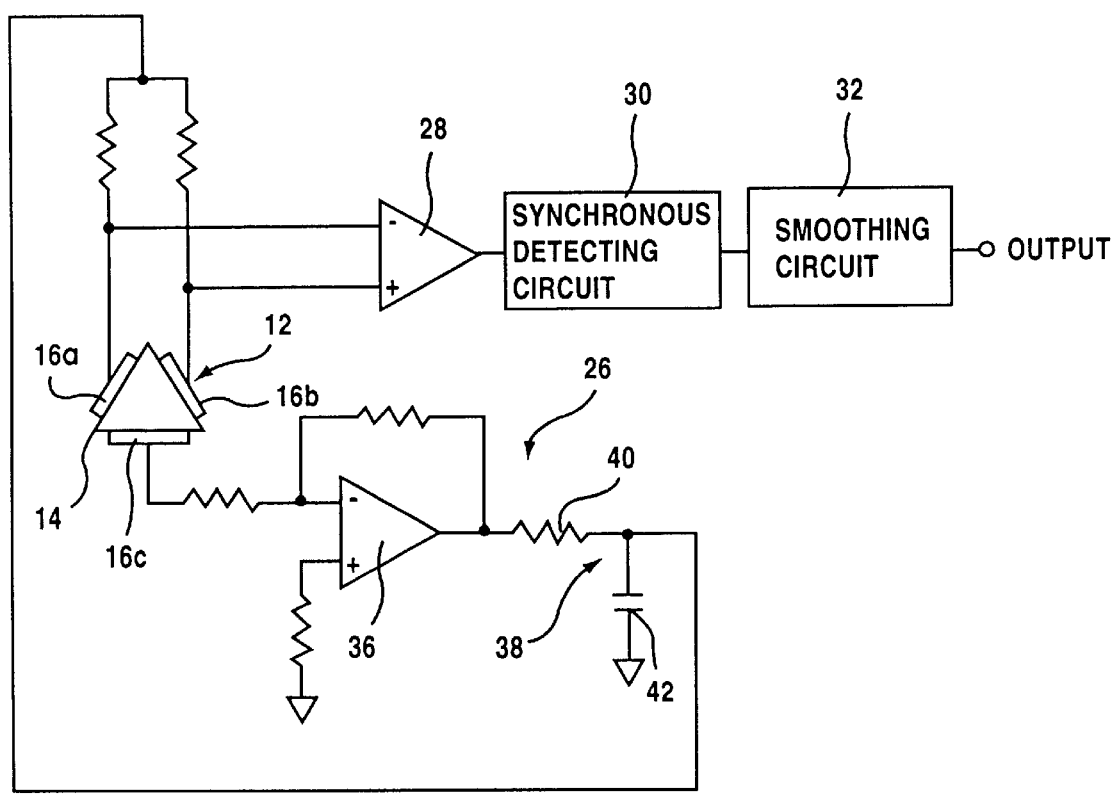
FIG. 7 is an illustrating view showing an another embodiment of the present invention.

As shown in FIG. 7, the oscillation circuit 26 includes, for example, an amplifier 36 and a phase shifter 38. As the phase shifter 38, a CR filter having a resistor 40 and a capacitor 42 is used. A temperature compensating capacitor is used as the capacitor 42. A signal from the piezoelectric element 16c for feedback is amplified by the amplifier 36, and a phase of the signal is modulated by the phase shifter 38 and applied to the piezoelectric elements 16a and 16b. Then, the vibrating body 14 is self-oscillated.

In the vibrating gyroscope 10, the temperature compensating capacitor is used in the oscillation circuit 26 to compensate a temperature characteristic of the oscillation circuit 26. There are several types of the temperature compensating capacitors having various temperature characteristics as shown in FIG. 4, the capacitor having a suitable characteristic is selected for a requirement in each case.

Figure 8:
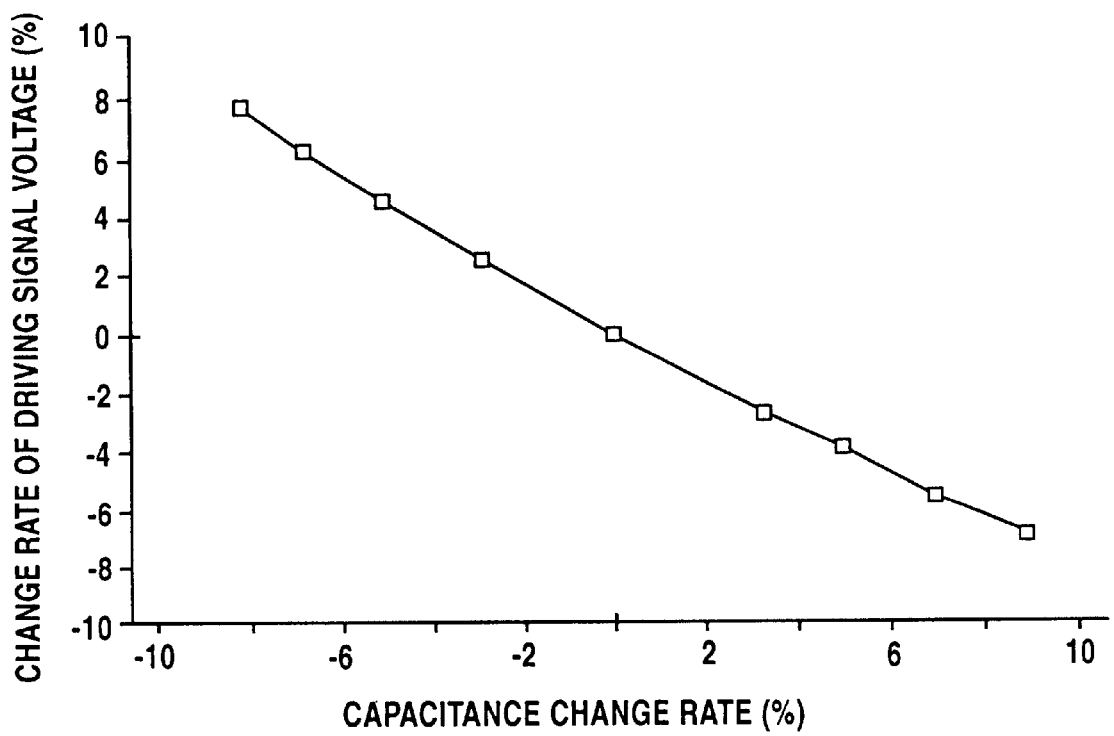
FIG. 8 is a graph showing a relation between a capacitance change rate of the temperature compensating capacitor and a change rate of a driving signal voltage obtained from an oscillation circuit.
Figure 9:
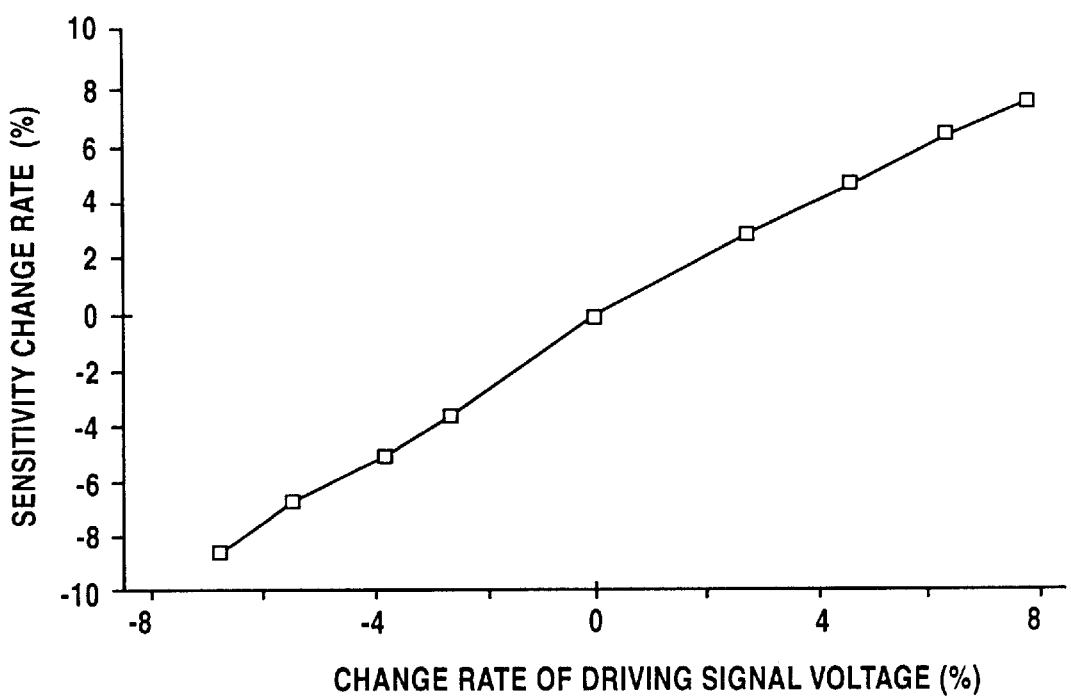
FIG. 9 is a graph showing a relation between the change rate of the driving signal voltage and the sensitivity change rate of the vibrating gyroscope.
Figure 10:
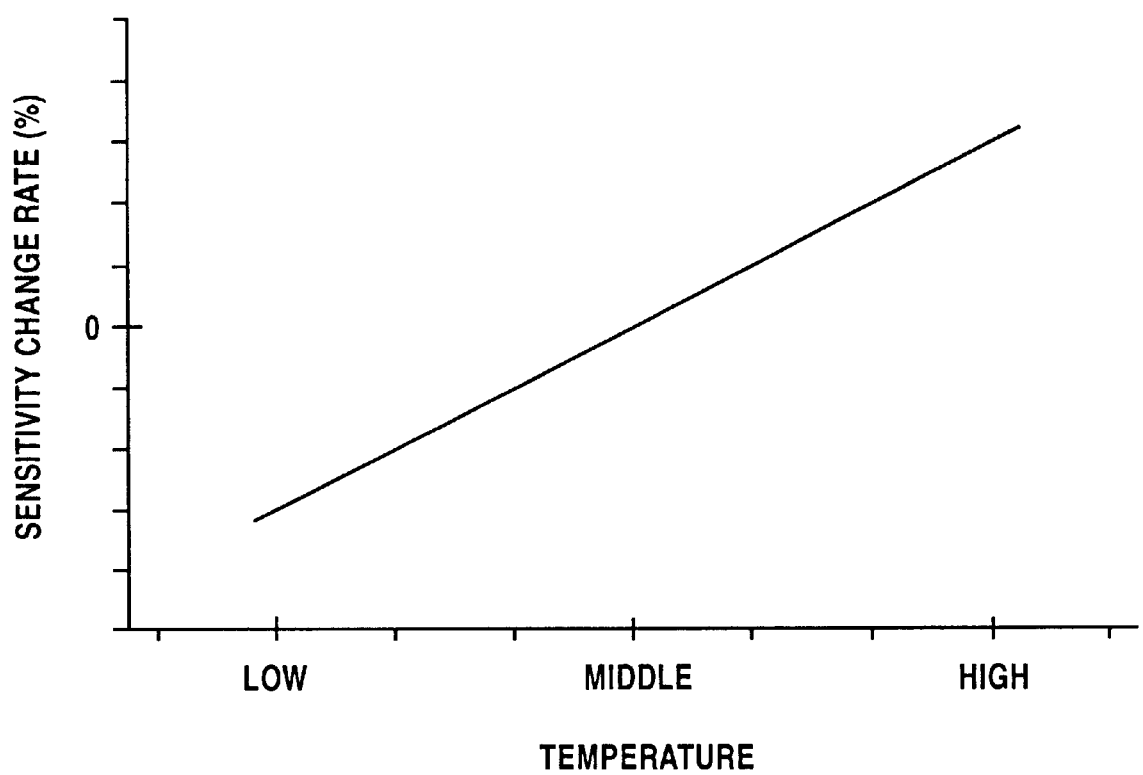
FIG. 10 is a graph showing a relation between the temperature and the sensitivity change rate of the vibrating gyroscope shown in FIG. 7.

In the vibrating gyroscope 10 using the oscillation circuit 26, as shown in FIG. 8, a voltage of a driving signal generated in the oscillation circuit 26 increases in proportion to decreasing a capacitance of the capacitor 42. Inversely, when the capacitance of the capacitor 42 increases, a signal voltage from the oscillating circuit 26 decreases. It is because a cut-off frequency of the CR filter used as the phase shifter 38 changes. When the voltage of the driving signal increases, an amplitude of a bending vibration of the vibrating body 14 becomes larger, then a signal corresponding to a rotational angular velocity increases. On the other hand, when the voltage of the driving signal decreases, the amplitude of the bending vibration of the vibrating body 14 becomes smaller, then the signal corresponding to the rotational angular velocity decreases. As shown in FIG. 9, the sensitivity change rate of the vibrating gyroscope 10 is approximately proportional to the voltage of the driving signal. Therefore, by using the temperature compensating capacitor having the temperature characteristic as shown in FIG. 4, a proportional relation is obtained between the temperature and the sensitivity of the vibrating gyroscope 10 as shown in FIG. 10.

Figure 11:
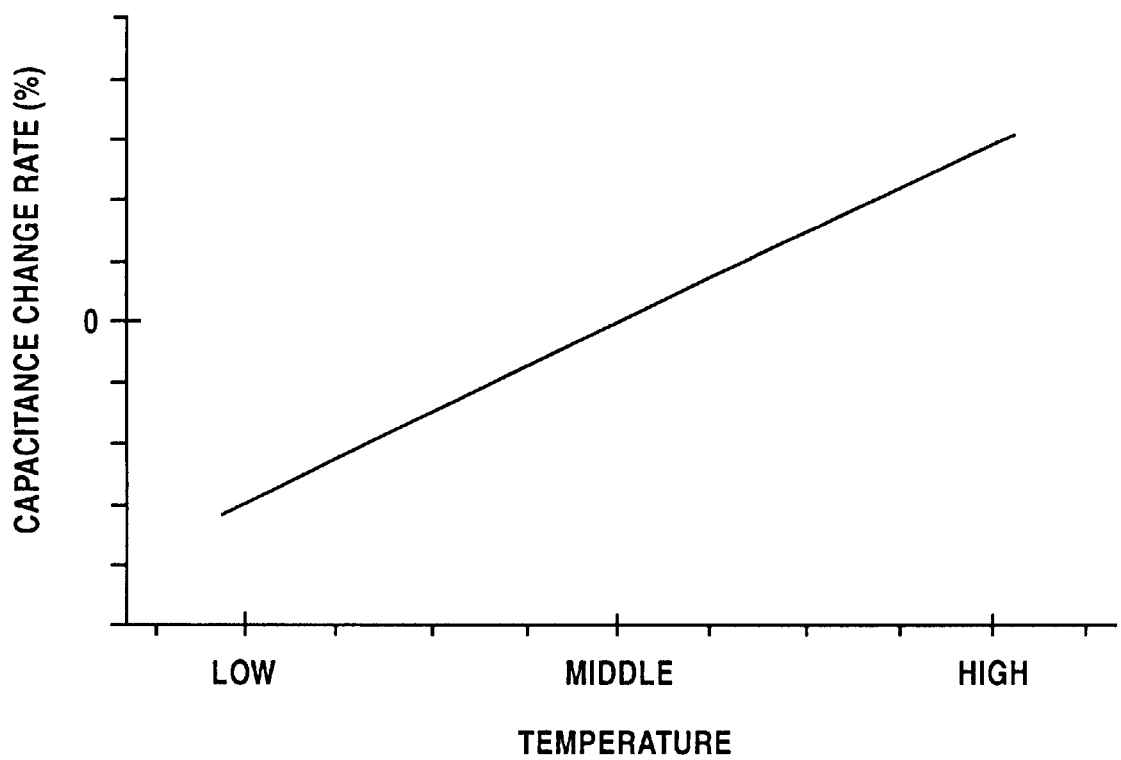
FIG. 11 is a graph showing a characteristic of a different type of the temperature compensating capacitor from a capacitor of FIG. 4.
Figure 12:
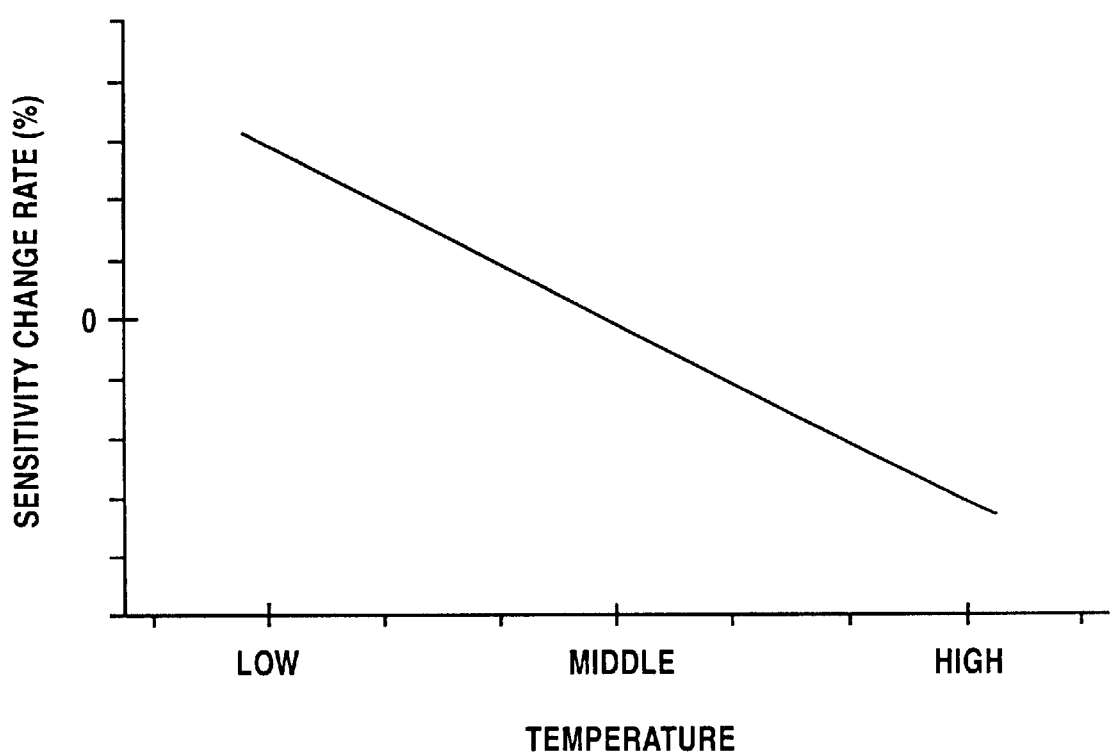
FIG. 12 is a graph showing a relation between the temperature and the sensitivity change rate of the vibrating gyroscope when the temperature compensating capacitor shown in FIG. 11 is used.

As such, since the sensitivity of the vibrating gyroscope 10 is in proportion to the temperature, when the oscillation circuit with the temperature compensating capacitor is used for the vibrator having the temperature characteristic of lower sensitivity for higher temperature, the sensitivity change caused by the temperature variation is canceled, and the vibrating gyroscope with constant sensitivity in spite of the variation of the temperature can be obtained. When the temperature compensating capacitor having the characteristic of higher capacitance for higher temperature as shown in FIG. 11 is used, the vibrating gyroscope having the characteristic of lower sensitivity for higher temperature as shown in FIG. 12 can be obtained. Therefore, the vibrator characteristic of higher sensitivity for higher temperature can be corrected by using this type of the temperature compensating capacitor.

Figure 13:
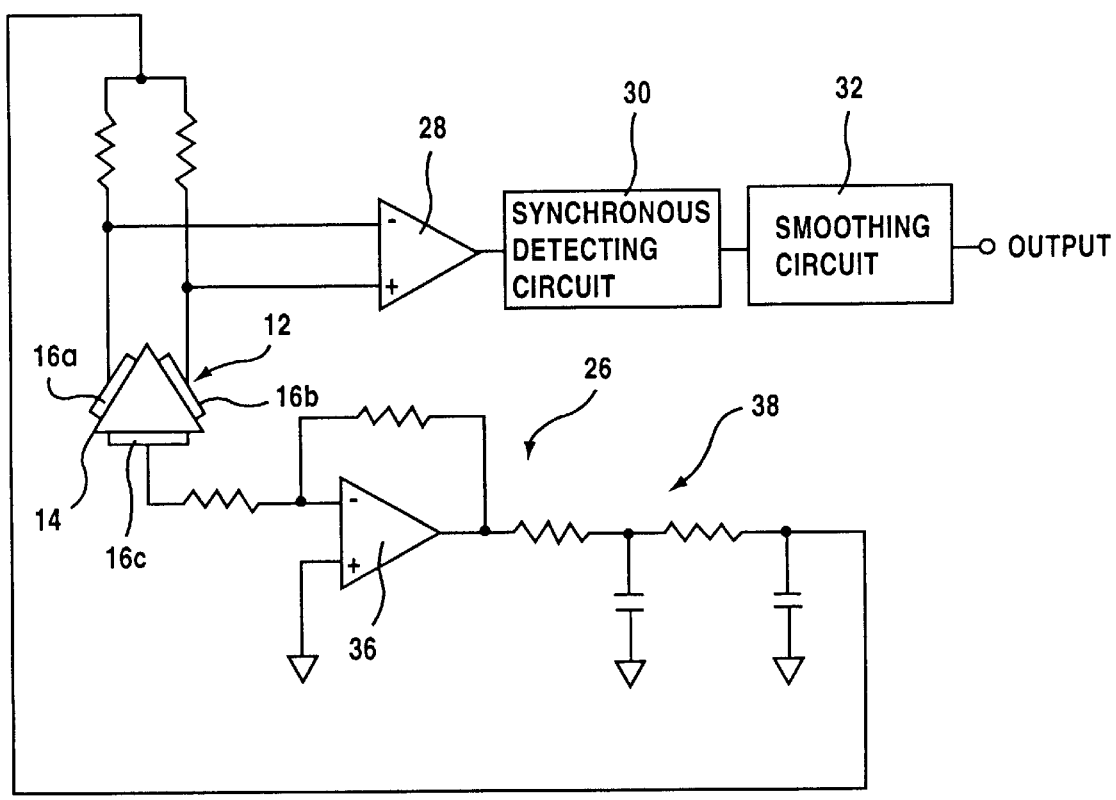
FIG. 13 is an illustrating view showing still another embodiment of the present invention.
Figure 14:
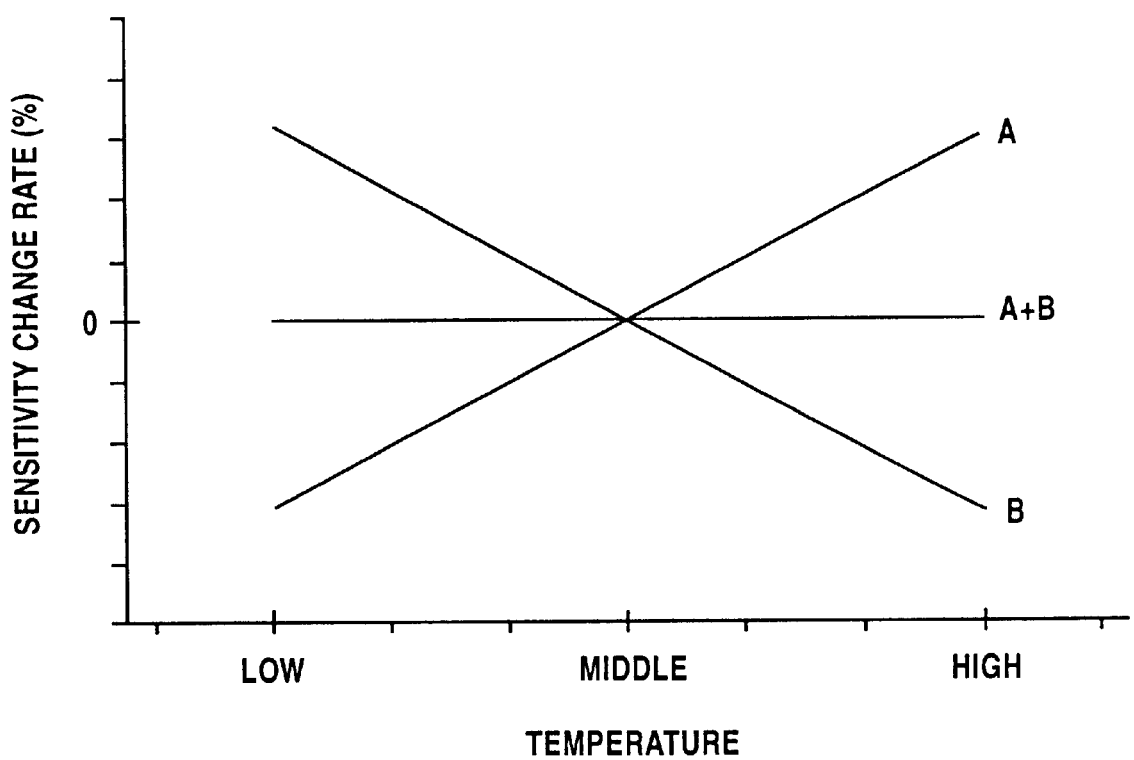
FIG. 14 is a graph showing a relation between the temperature and the sensitivity change rate when the temperature compensating capacitors having different characteristic are used, and a relation between the temperature and the sensitivity change rate in case of the vibrating gyroscope shown in FIG. 13 with these temperature compensating capacitors.
Figure 15:
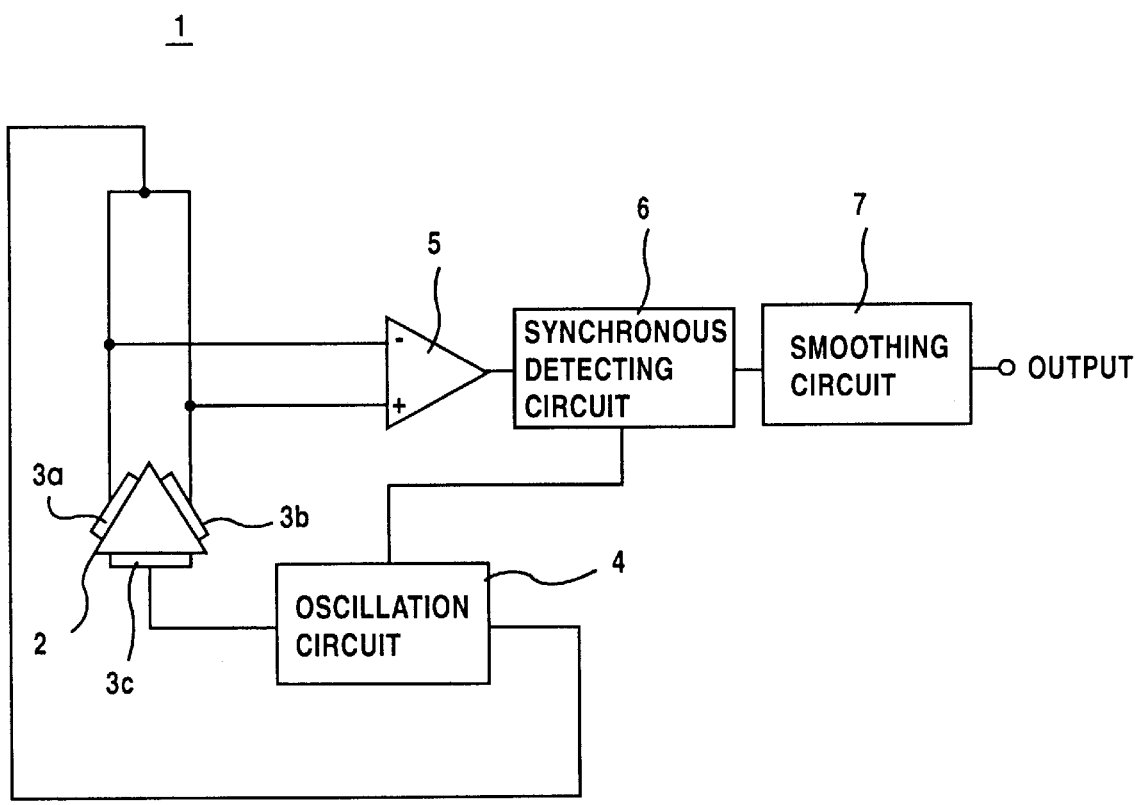
FIG. 15 is an illustrating view showing a conventional vibrating gyroscope.
Figure 16:
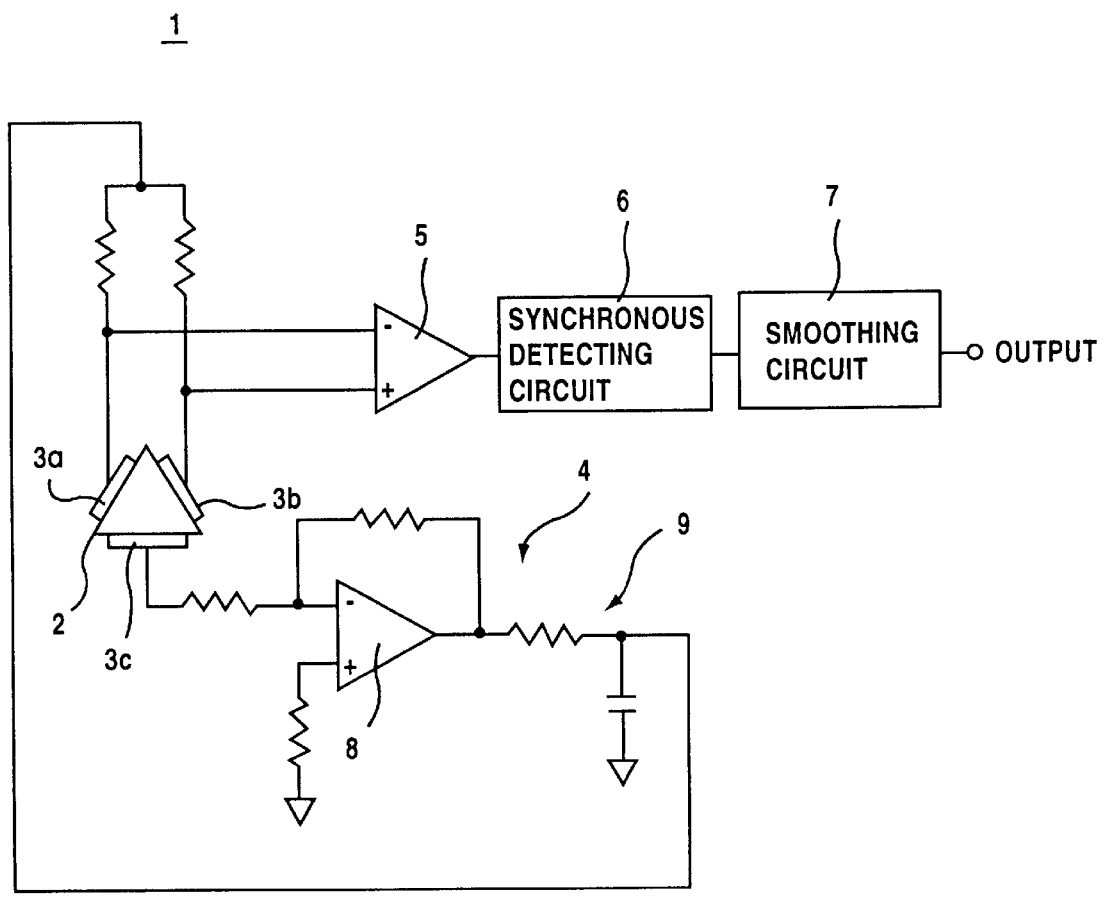
FIG. 16 is an illustrating view showing a conventional vibrating gyroscope with a concrete oscillation circuit.

In case of using two stage CR filters for the phase shifter 38 as shown in FIG. 13, the temperature characteristic of the sensitivity of the vibrating gyroscope 10 can be finely tuned by using the temperature compensating capacitors which have a different temperature characteristic in two filter circuits. For example, as shown in FIG. 14, when an inversion of the sensitivity slope is obtained in two cases of using the temperature compensating capacitor A and of using the temperature compensating capacitor B with a different characteristic from A, the vibrating gyroscope with an approximately constant sensitivity is obtained by using the temperature compensating capacitors A and B for two CR filter circuits.

The temperature characteristic of the vibrating gyroscope 10 can be compensated by using the temperature compensating capacitor in the phase shifter 38 of the oscillating circuit 26. The capacitors are less expensive, and the temperature compensation can be attained by using capacitors with low cost as compared with the method using expensive parts such as thermistors.

In the embodiment mentioned above, though the vibrating body 14 has a regular triangular prism shape, it can be other shape such as rectangular prism shape. As the material of the vibrating body 14, a piezoelectric material can be used. In this case, electrodes as driving means, detecting means and feedback means are attached on the side faces of the vibrating body 14 instead of the piezoelectric elements. In the vibrator of this kind, the vibrating body having cylindrical shape can be used. In case of using such vibrator, the vibrating gyroscope having the characteristic of the constant sensitivity for the variation of the environment temperature can be obtained by connecting the temperature compensating capacitor between the electrodes for detecting, or by using the temperature compensating capacitor in the phase shifter of the oscillation circuit.

While the present invention has been particularly described and shown, it is to be understood that such description is used merely as an illustration and example rather than limitation, and the spirit and scope of the present invention is determined solely by the terms of the appended claims.

What is claimed is:

1. A vibrating gyroscope comprising:
    a vibrating body; and
    an oscillation circuit, connected to said vibrating body, for exciting a vibration on said vibrating body, wherein
    said oscillation circuit includes an amplifier and a phase shifter connected to said amplifier, said phase shifter having a capacitor, said phase shifter for modulating a phase of a signal for exciting said vibration on said vibrating body, and a temperature compensating capacitor is used as said capacitor wherein vibration amplitude of the vibrating body is controlled based on capacitance characteristics of the temperature compensating capacitor.

2. A vibrating gyroscope in accordance with claim 1, wherein said phase shifter consists of multistage circuits each of which has a resistor and said temperature compensating capacitor.

3. A vibrating gyroscope in accordance with claim 2, wherein said temperature compensating capacitors of said multistage circuits have different temperature characteristics.

4. A vibrating gyroscope comprising:

a vibrating body; and an oscillation circuit, connected to said vibrating body, for exciting a vibration on said vibrating body, wherein said oscillation circuit includes an amplifier and a phase shifter connected to said amplifier, said phase shifter having a capacitor, said phase shifter for modulating a phase of a signal for exciting said vibration on said vibrating body, and a temperature compensating capacitor is used as said capacitor.

5. A vibrating gyroscope in accordance with claim 4, wherein a sensitivity of the vibrating gyroscope becomes higher in proportion to a rise in temperature, and the temperature compensating capacitor has a characteristic of capacitance which increases in proportion to the rise in temperature.

6. A vibrating gyroscope in accordance with claim 5, wherein said phase shifter consists of multistage circuits each of which has a resistor and said temperature compensating capacitor.

7. A vibrating gyroscope in accordance with claim 6, wherein said temperature compensating capacitors of said multistage circuits have different temperature characteristics.

8. A vibrating gyroscope in accordance with claim 4, wherein a sensitivity of the vibrating gyroscope becomes lower in proportion to a rise in temperature, and the temperature compensating capacitor has a characteristic of capacitance which decreases in proportion to the rise in temperature.

9. A vibrating gyroscope in accordance with claim 8, wherein said phase shifter consists of multistage circuits each of which has a resistor and said temperature compensating capacitor.

10. A vibrating gyroscope in accordance with claim 9, wherein said temperature compensating capacitors of said multistage circuits have different temperature characteristics.

11. A vibrating gyroscope in accordance with claim 4, wherein a sensitivity of the vibrating gyroscope becomes higher in proportion to a rise in temperature, and the phase shifter has a characteristic of cut-off frequency which decreases in proportion to the rise in temperature.

12. A vibrating gyroscope in accordance with claim 11, wherein said phase shifter consists of multistage circuits each of which has a resistor and said temperature compensating capacitor.

13. A vibrating gyroscope in accordance with claim 12, wherein said temperature compensating capacitors of said multistage circuits have different temperature characteristics.

14. A vibrating gyroscope in accordance with claim 4, wherein a sensitivity of the vibrating gyroscope becomes lower in proportion to a rise in temperature, and the phase shifter has a characteristic of cut-off frequency which increases in proportion to the rise in temperature.

15. A vibrating gyroscope in accordance with claim 14, wherein said phase shifter consists of multistage circuits each of which has a resistor and said temperature compensating capacitor.

16. A vibrating gyroscope in accordance with claim 15, wherein said temperature compensating capacitors of said multistage circuits have different temperature characteristics.

* * * * *